United States Patent
Shimamura et al.

(10) Patent No.: US 7,191,359 B2
(45) Date of Patent: Mar. 13, 2007

(54) FAIL-SAFE CONTROLLER

(75) Inventors: Kotaro Shimamura, Chiyoda-ku (JP);
Naohiro Ikeda, Chiyoda-ku (JP);
Takeshi Takehara, Chiyoda-ku (JP)

(73) Assignee: Hitachi, Ltd., Chiyoda-ku (JP)

( * ) Notice: Subject to any disclaimer, the term of this patent is extended or adjusted under 35 U.S.C. 154(b) by 0 days.

(21) Appl. No.: 10/891,360

(22) Filed: Jul. 13, 2004

(65) Prior Publication Data
US 2005/0080492 A1 Apr. 14, 2005

(30) Foreign Application Priority Data
Oct. 10, 2003 (JP) .............................. 2003-351479

(51) Int. Cl.
| | |
|---|---|
| G06F 11/00 | (2006.01) |
| G06F 7/02 | (2006.01) |
| G06F 7/50 | (2006.01) |
| G11C 29/00 | (2006.01) |
| H03M 13/00 | (2006.01) |
| G05B 19/18 | (2006.01) |
| G05B 11/01 | (2006.01) |

(52) U.S. Cl. .................... 714/12; 714/54; 714/719; 714/819; 708/671; 700/2; 700/20; 700/21; 700/79

(58) Field of Classification Search .................. 700/2, 700/20, 21, 23, 27, 78, 79; 708/136, 168, 708/169, 200, 207, 490, 671, 801; 712/220, 712/221, 223; 714/1, 11, 47–54, 719, 819, 714/12; 340/146.2; 711/151, 158
See application file for complete search history.

(56) References Cited

U.S. PATENT DOCUMENTS

| | | | | | |
|---|---|---|---|---|---|
| 4,099,242 | A | * | 7/1978 | Houston et al. .............. 707/2 |
| 5,103,221 | A | * | 4/1992 | Memmola ................. 340/5.31 |
| 5,504,679 | A | * | 4/1996 | Wada et al. .................. 701/41 |
| 5,748,873 | A | * | 5/1998 | Ohguro et al. ................ 714/11 |
| 6,158,021 | A | * | 12/2000 | Ziegler et al. ............... 714/25 |
| 6,243,629 | B1 | * | 6/2001 | Sugimoto et al. ............ 701/29 |
| 6,330,646 | B1 | * | 12/2001 | Clohset et al. ............. 711/158 |
| 6,618,637 | B1 | * | 9/2003 | Kerner ....................... 700/108 |
| 6,751,749 | B2 | * | 6/2004 | Hofstee et al. .............. 714/11 |
| 6,901,487 | B2 | * | 5/2005 | Duranton .................... 711/151 |
| 6,931,395 | B2 | * | 8/2005 | Day et al. ...................... 707/3 |

FOREIGN PATENT DOCUMENTS

| | | |
|---|---|---|
| JP | 09-288150 | 4/1997 |
| JP | 10-214198 | 11/1998 |
| WO | WO00/05630 | 2/2000 |

* cited by examiner

*Primary Examiner*—Crystal J. Barnes
(74) *Attorney, Agent, or Firm*—Crowell & Moring LLP

(57) ABSTRACT

A controller that receives an input of a status of an apparatus, executes predetermined arithmetic and logical operations, and outputs a control signal of the apparatus, and is equipped with a plurality of processors for executing the arithmetic and logical operations; a plurality of data storage elements for storing respective results of the arithmetic and logical operations of the plurality of the processors; a comparator for comparing the results of the arithmetic and logical operations of the plurality of the processors stored in the plurality of the data storage elements; and a comparison record storage element for storing a record of the comparison results of the comparator.

18 Claims, 10 Drawing Sheets

| Bus 154 | Bus 122 | Selector Signal 216′ | Wait Signal 212′ | RAM 208 | Control Signal 214′ |
|---|---|---|---|---|---|
| No Request | No Request | Bus 154 | OFF | Stoppage | OFF |
| No Request | Read | Bus 122 | OFF | Read | OFF |
| Read | No Request | Bus 154 | OFF | Read | ON |
| Read | Read | Bus 122 | ON | Read | ON |
| Write | No Request | Bus 154 | OFF | Write | OFF |
| Write | Read | Bus 122 | ON | Read | OFF |

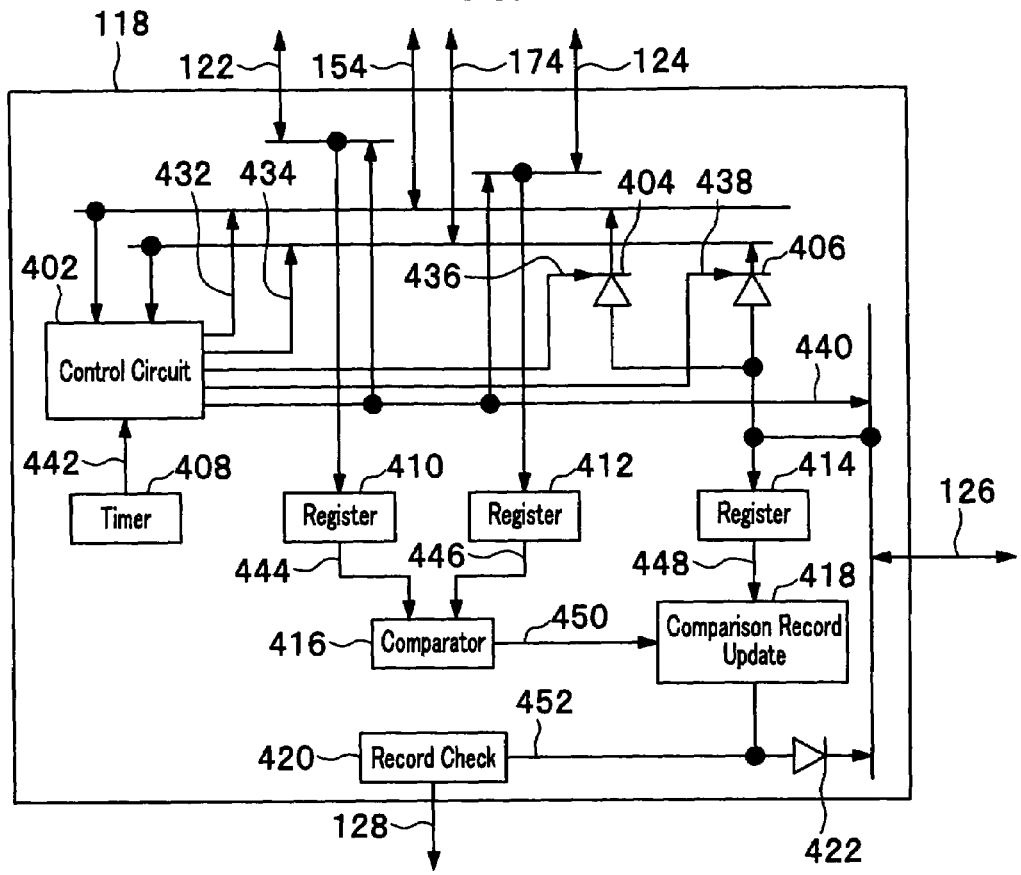

| Timer Output 442 | Bus 154 | Address 440 | Wait Signal 432' | Control Signal 436' | Bus 122, 124 | Bus 126 |
|---|---|---|---|---|---|---|
| No Request | No Request | Comparison Address | OFF | OFF | Stoppage | Stoppage |
| No Request | Read | Bus 154 | OFF | ON | Stoppage | Read |
| Comparison | No Request | Comparison Address | OFF | OFF | Read | Read |
| Comparison | Read | Comparison Address | ON | ON | Read | Read |
| Update | No Request | Comparison Address | OFF | OFF | Stoppage | Write |
| Update | Read | Comparison Address | ON | ON | Stoppage | Write |

*1 : An access from a comparator is made to a same address as that from CPU-A.
*2 : An access from a comparator is made to a same address as that from CPU-B.

FAIL-SAFE CONTROLLER

CROSS-REFERENCE TO A RELATED APPLICATION

This application claims the benefit of the filing date of Japanese Patent Application No. 2003-351479, filed on Oct. 10, 2003.

BACKGROUND OF THE INVENTION

1. Field of the Invention

The present invention relates to a controller for taking in an input such as a status of an apparatus, executing predetermined arithmetic and logical operations, and outputting a control signal of the apparatus; and further in particular, to a fail-safe controller for executing the arithmetic and logical operations by a plurality of processors, determining correctness of an arithmetic and logical operations result by comparing arithmetic and logical operations results, and control an output to a safe side in a case that the arithmetic and logical operations result is not correct.

2. Description of the Related Art

As a conventional fail-safe controller, for example, there is one described in Japanese Patent Laid-Open Publication Hei 9-288150. This conventional example executes a same processing by a plurality of processors, compares an output of each processor, and thereby verifies correctness of the processors. When in the output of each processor a disagreement occurs, it becomes possible to maintain safety by determining that a malfunction occurs and stopping an apparatus at a safe side.

However, in accordance with the conventional example, when an anomaly occurs in input data from an outside due to an extraneous noise and the like, a disagreement occurs in input data of each processor. As a result, because it becomes necessary to stop an apparatus at a safe side, there is a problem that an availability of the apparatus lowers.

A method for handling the problem is described in Japanese Patent Laid-Open Publication Hei 10-214918. In this example, when in the output of each processor a disagreement occurs, a method is disclosed for avoiding an influence of an extraneous noise and the like and improving the availability by retrying a processing with returning to a status of start timing of a control period.

However, because in the conventional example an extra processing such as a backup and a restoration becomes necessary due to retrying the processing with returning to the status of the start timing of the control period, there is a problem that software becomes complex. In addition, in order to maintain a time for retrying the processing, it is necessary to suppress a processing time not more than a half of a control period of a critical processing and thereby there is a possibility that a rate of operation of a processor lowers.

Consequently, it is strongly requested a controller that can avoid an influence of an extraneous noise and the like and improve the availability of an apparatus without causing a complexity of software and a lowering of the rate of operation of a processor.

SUMMARY OF THE INVENTION

A controller of the present invention comprises a plurality of data storage elements for storing respective arithmetic and logical operations results of a plurality of processors, a comparator for comparing the arithmetic and logical operations results stored in the plurality of the data storage elements, and a comparison record storage element for storing a record of the comparison results of the comparator.

In accordance with the controller of the present invention, if even when a disagreement occurs in an arithmetic and logical operations result due to an extraneous noise and the like, the disagreement returns to a normal status within a constant time, a processing can-be continued; and it can be made to avoid an influence of the extraneous noise and the like and improve an availability of an apparatus without causing a complexity of software and a lowering of a rate of operation of the processors.

BRIEF DESCRIPTION OF THE DRAWINGS

FIG. 4 is a block diagram showing a first example of a comparator 118 of FIG. 1.

FIG. 5 is a drawing showing an operation of the comparator 118 shown in FIG. 4.

DESCRIPTION OF THE MOST PREFERRED EMBODIMENTS

Embodiment 1

Here will be described each embodiment of the present invention.

Figure 1:
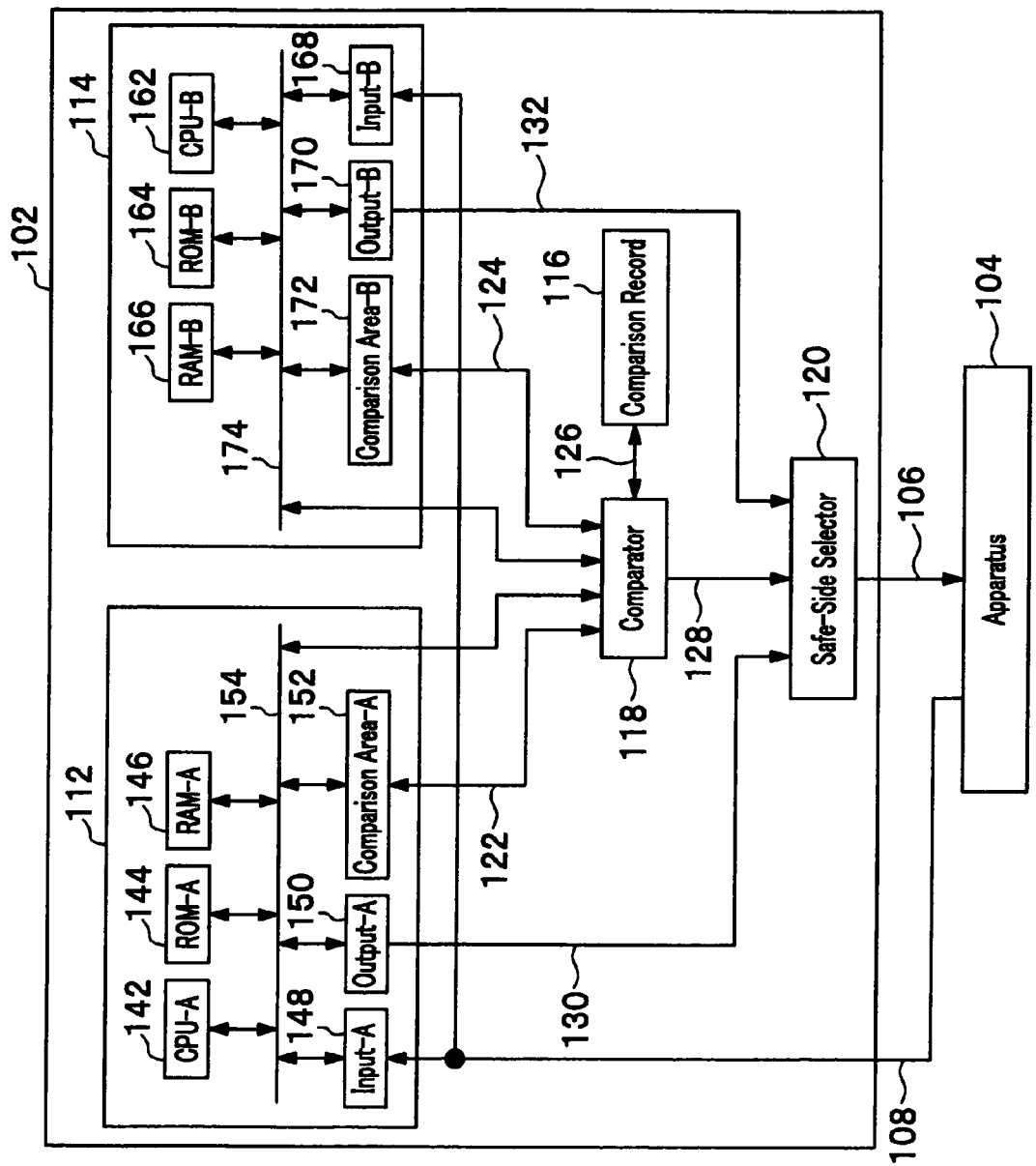
FIG. 1 is a block diagram showing a first example of a controller in accordance with the present invention.

FIG. 1 is a block diagram showing a first example of a controller in accordance with the present invention.

A controller 102 takes in a status of an apparatus 104 through a control line 108, executes predetermined arithmetic and logical operations, and outputs a control signal 106' (' on a right shoulder of a number represents a signal of a line or equipment with a relevant number) of the apparatus 104.

A processor unit 112 comprises a CPU-A142, a ROM-A144, a RAM-A146, an input-A148, an output-A150; and a comparison area-A152.

The CPU-A142 takes in a program from the ROM-A144 through a bus 154 and executes a specified processing to the program. A processing content of the CPU-A142 is comprised of taking in data from the input-A148 and a comparison record from a comparator 118, reading/writing an arithmetic and logical operations result into the RAM-A146 and the comparison area-A152, and writing data for apparatus control into the output-A150.

The ROM-A144 is a read-only memory for a program storage of the CPU-A142.

The RAM-A146 is a random access memory for an arithmetic and logical operations result storage of the CPU-A142.

The input-A148 takes in a status of the apparatus 104 through the control line 108 and outputs it to the bus 154, depending on a request of the CPU-A142.

The output-A150 takes in write data from the CPU-A142 through the bus 154 and outputs it to a control signal 130' of the apparatus 104.

The comparison area-A152 is an element for storing an arithmetic and logical operations result that becomes comparison objects of the comparator 118 out of comparison results of the CPU-A142. By providing the RAM-A146 and the comparison area-A152 as elements for storing arithmetic and logical operations results, they can be made to be separately used such that an arithmetic and logical operations result easy to receive an influence of an extraneous noise and the like is stored in the RAM-A146 and another arithmetic and logical operations result difficult to receive the influence of the extraneous noise and the like is stored in the comparison area-A152; and thus it can be lowered a probability that the arithmetic and logical operations result in the comparator 118 disagrees.

A configuration of a processor unit 114 is same as that of the processor unit 112 including a CPU-B162, a ROM-B164, a RAM-B166, an input-B168, an output-B170, a comparison area-B172, and a bus 174.

Although a description below shows an example that the CPU-A142 and a CPU-B162 asynchronously execute a processing, they can also be made so as to synchronously execute the processing, that is, execute a same processing at a same hour. However, because there is no assurance that operations of the CPU-A142 and the CPU-B162 completely become equal, the embodiment shows nothing but the example of asynchronously executing the processing.

The comparator 118 reads arithmetic and logical operations results stored in the comparison area-A152 and the comparison area-B172 through buses 122 and 124, and compares them. In addition, the comparator 118 updates a comparison record of a comparison record storage element 116 through a bus 126. Furthermore, when the updated comparison record satisfies a specific status, the comparator 118 outputs an apparatus stoppage request to a control line 128. Still furthermore, the comparator 118 receives a read request from the CPU-A142 and the CPU-B162 through buses 154 and 174, reads data of the comparison record storage element 116, and outputs it to the buses 154 and 174.

The comparison record storage element 116 is an element for storing the comparison record and is comprised of any of a random access memory and a register file.

When statuses of control lines 130 and 132 agree and the apparatus stoppage request is not output to the control line 128, a safe-side selector 120 outputs a control signal 106' of the apparatus 104 to a control line 106; when the statuses of control lines 130 and 132 disagree or the apparatus stoppage request is output to the control line 128, a safe-side selector 120 outputs the control signal 106' for safely stopping the apparatus 104 to the control line 106.

Meanwhile, although the embodiment describes an example of stopping an apparatus by the safe-side selector 120, it is thought a method that any of the CPU-A142 and the CPU-B162 reads a comparison record of the comparison record storage element 116 and outputs a signal indicating an apparatus stoppage to any of the control lines 130 and 132 when a constant status is satisfied. In accordance with the method it can be made to change an apparatus stoppage status by rewriting software. In addition, it is also thought another method that a stoppage processing is executed by the safe-side selector 120 and the CPU-A142 or both of the CPU-A142 and the CPU-B162. In this case, for example, even when an apparatus stoppage signal is not output to the control line 128 due to a trouble of the comparator 118, the apparatus can be safely stopped by any of the CPU-A142 and the CPU-B162 and thus safety is improved.

Figures 2, 3:
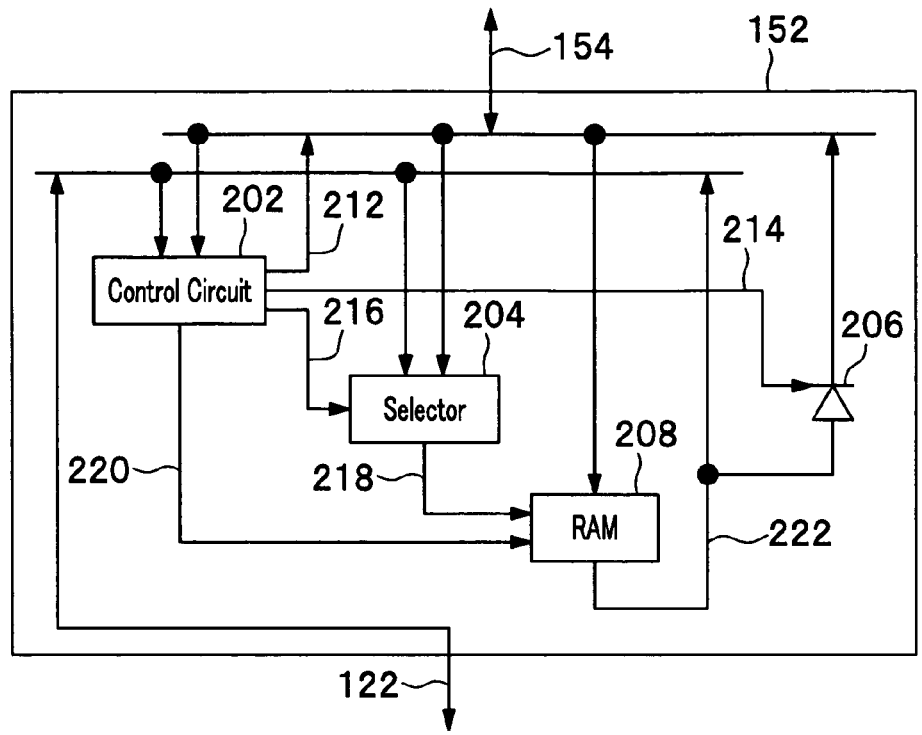
FIG. 2 is a block diagram showing a first example of a comparison area-A152 of FIG. 1.
FIG. 3 is a drawing showing an operation of the comparison area-A152 shown in FIG. 2.

FIG. 2 is a block diagram showing a first example of the comparison area-A152 of FIG. 1.

A control circuit 202 receives a request from the buses 154 and 122 and outputs a wait signal 212' of the bus 154, a control signal 214' of an output driver 206, a control signal 216' of a selector 204, and a control signal 220' of a RAM 208.

The selector 204 selects either one of an address of the bus 154 or 122 in accordance with the control signal 216' and outputs it to a control line 218.

The output driver 206 outputs data of a control line 220 when the control signal 214' is ON and outputs nothing when the control signal 214' is OFF.

The RAM 208 is a random access memory. When a read request is output to the control line 220, the RAM 208 outputs data to the control line 222, corresponding to an address output to the control line 218.

FIG. 3 is a drawing showing an operation of the comparison area-A152 shown in FIG. 2. In addition, when a write request is output to the control line 220, the RAM 208 takes in data from the bus 154, and stores it in the address output to the control line 218.

In the bus 154 there can be three kinds of statuses: no request, a read request, and a write request. On the other hand, in the bus 122 there is no write request, so there can be two kinds of statuses: no request and the read request.

When there is a request for both of the buses 154 and 122, make the bus 122 prior and the wait signal 212' of the bus 154 ON. Thus even if the CPU-A142 crashes and a status, where a request is issued to the bus 154, continues, the read request from the bus 122 can be responded.

An arbitration method of buses is not limited to the embodiment and various conventional techniques such as a round robin, which alternately gives two buses a priority, is applicable.

FIG. 4 is a block diagram showing a first example of the comparator 118 of FIG. 1.

A control circuit 402 receives a control signal 442' from a timer 408 and outputs addresses and control signals of the buses 122, 124, and 126. Here, the output addresses are updated every time when there is a request from the timer 408 so as to access all address areas of comparison areas in turn. In addition, the control circuit 402 receives a request from the bus 154, arbitrates it with that from the timer 408, and then outputs a wait request for a control 432 or, a control signal 436' of a driver 404, and the addresses and control signals to a control line 440. Furthermore, the control circuit 402 receives a request from the bus 174, arbitrates it with those from the timer 408 and the bus 154, and then outputs a wait request for a signal 434' or a control signal 438' of a driver 406 and the addresses and control signals to the control line 440.

Meanwhile, the embodiment outputs a same address, which is output from the control circuit 402 to the control line 440, to all of the buses 122, 124, and 126. This indicates that addresses of a comparison area and a comparison record storage element correspond one to one. As another example, one address of the comparison record storage element 116 can also be made to correspond to a plurality of addresses of the comparison area. Therefore, it is acceptable to select a part of bits of an address, which is output to the control line 440, and output it to the bus 126. Thus it can be made to reduce a size of the comparison record storage element 116.

The output driver 404 outputs data of the bus 126 to the bus 154 when a control line 436 is ON; it outputs nothing when the control line 436 is OFF.

The output driver 406 outputs data of the bus 126 to the bus 174 when a control line 438 is ON; it outputs nothing when the control line 438 is OFF.

The timer 408 is a circuit for outputting requests of a comparison and an update to the control circuit 402 at a constant period.

When a read request is output to the bus 122, a register 410 takes in data from the bus 122 and outputs the taken-in data to a control line 444.

When a read request is output to the bus 124, a register 412 takes in data from the bus 124 and outputs the taken-in data to a control line 446.

When a read request is output to the bus 126, a register 414 takes in data from the bus 126 and outputs the taken-in data to a control line 448.

A comparator 416 compares data of the control line 444 with that of the control line 446 and outputs the comparison result to a control line 450.

A comparison record update circuit 418 takes in a comparison record from the control line 448 and the comparison result from the control line 450, and outputs a comparison record after an update in accordance with a constant algorism to a control line 452. As an update method of the comparison record, it can be thought, for example, the method of making the comparison record 0 in a case of an agreement of the comparison result and adding 1 to the comparison record in a case of a disagreement of the comparison result. In addition, it can also be thought another method of subtracting 1 (in a case of 0 leave 0 as it is) from the comparison record in a case of the agreement of the comparison result and adding 1 to the comparison record in a case of the disagreement of the comparison result. In addition, it can also be thought still another method of shifting the comparison record one bit to a significant side and substituting a least significant bit for the comparison result.

A record check circuit 420 takes in the comparison record after the update from the control line 452 and outputs an apparatus stoppage signal to the control line 128 when a constant condition comes into effect. As a condition for outputting the apparatus stoppage signal, such cases can be thought: a value of the comparison record exceeds a constant value; and the value of the comparison record agrees on a specific pattern. Because once the apparatus stoppage signal is output to the control line 128, correctness of the controller is determined to be damaged, the controller continues holding the apparatus stoppage signal until all the controller is reset.

When a write request is output to the bus 126, an output driver 422 outputs a comparison record after an update of the control line 452.

FIG. 5 is a diagram showing an operation of the comparator 118 shown in FIG. 4.

Although in FIG. 5 nothing but a timer output 442 and the bus 154 are described, a relationship between the timer output 442 and the bus 174 is also same. In addition, when a conflict occurs between the buses 154 and 174, make the bus 154 prior.

There are three kinds in the timer output 442, no request, a comparison, and an update. On the other hand, there are two kinds in the bus 154, no request and a read request. Make a write from the bus 154 a prohibition and interpret it as no request when a write request is issued.

Figure 6:
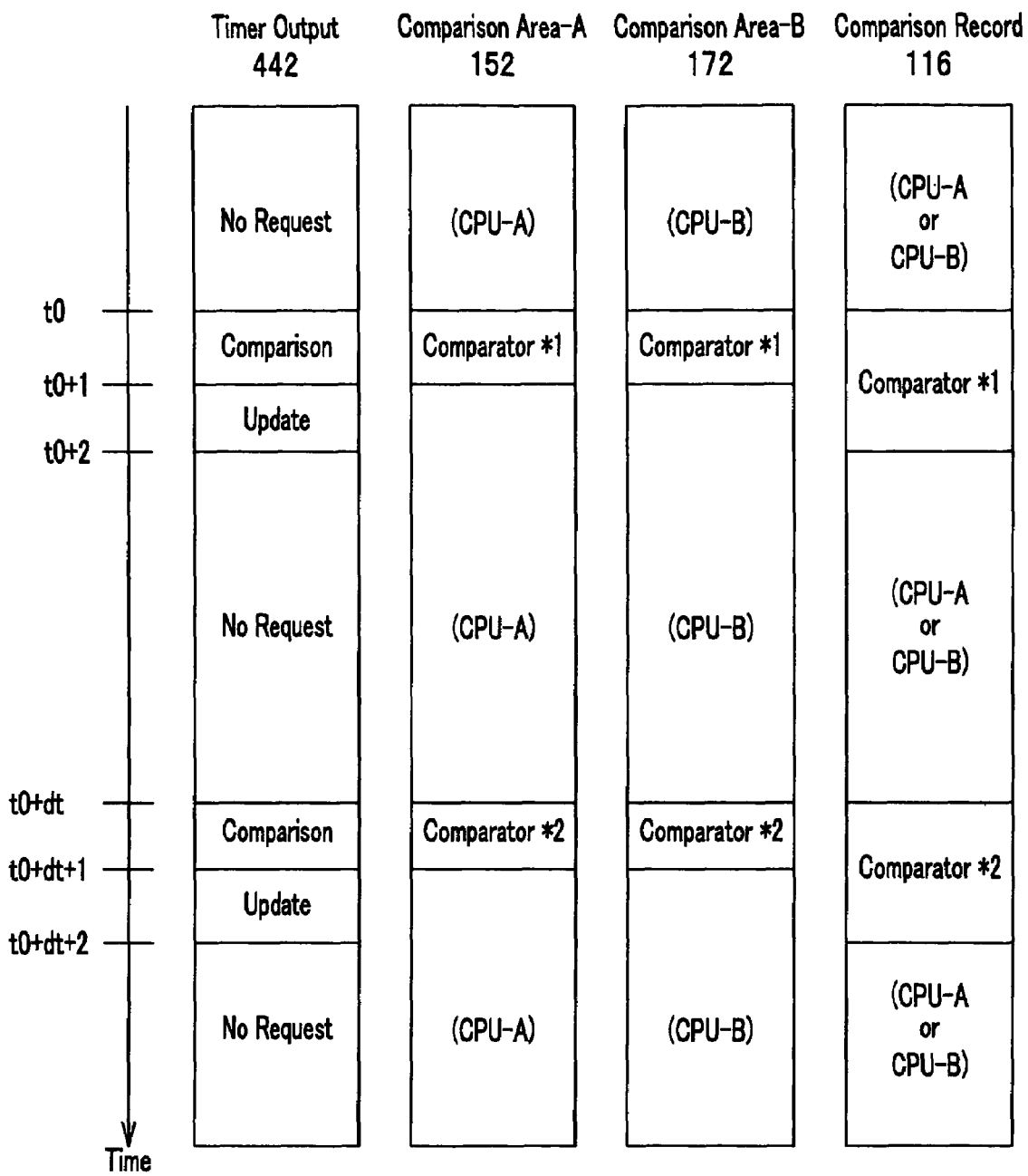
FIG. 6 is a timing chart showing an operation of the comparison area-A152, a comparison area-B172, and a comparison record storage element 116 of FIG. 1 when using the comparator 118 shown in FIG. 4.

FIG. 6 is a timing chart showing an operation of the comparison area-A152, the comparison area-B172, and the comparison record storage element 116 of FIG. 1 when using the comparator 118 shown in FIG. 4.

Because the timer output 442 indicates the comparison during time t0 to t0+1, the comparison area-A152, the comparison area-B172, and the comparison record storage element 116 are read from the comparator 118.

Because the timer output 442 indicates the update during time t0+1 to t0+2, the comparison record storage element 116 is written from the comparator 118.

Operations from time t0+dt to t0+dt+2 are same as those from time t0 to t0+2.

The comparison area-A152, the comparison area-B172, and the comparison record storage element 116 can respond to a request from any of the CPU-A and the CPU-B while there is no access from the comparator 118. While there is an access from the comparator 118, the request from any of the CPU-A and the CPU-B results in being awaited by a corresponding wait signal.

The embodiment is designed not to compare all addresses of the comparison area-A152 and the comparison area-B172 at once, but to update an address every time and compare all addresses of the comparison areas at a plurality of periods. As another example, it can also be thought a method of continuously comparing all addresses of the comparison areas. In that case a comparison period can be made longer than that of the embodiment.

Embodiment 2

Figure 7:
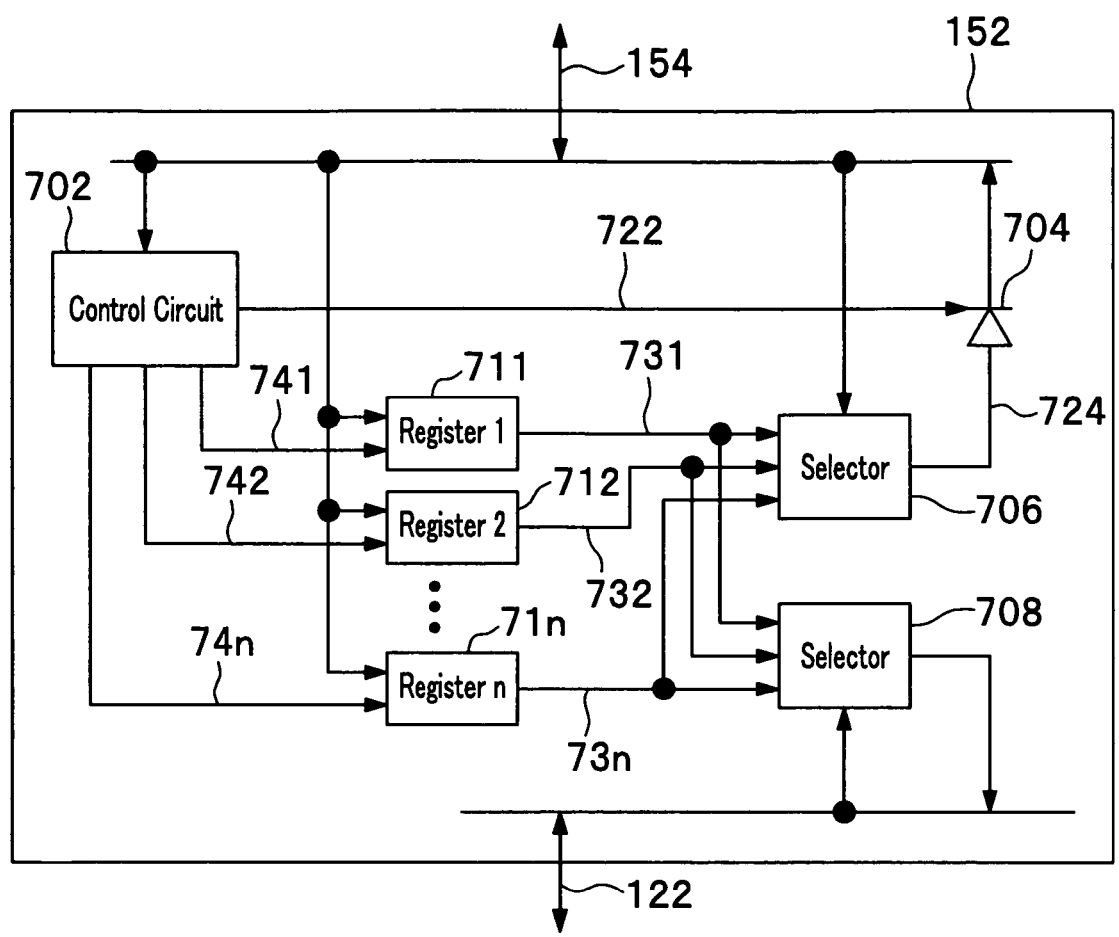
FIG. 7 is a block diagram showing a second example of the comparison area-A152 of FIG. 1.

FIG. 7 is a block diagram showing a second example of the comparison area-A152 of FIG. 1.

A feature of the embodiment exists in a point of using registers 711 to 71n as areas for storing arithmetic and logical operations results. Thus it can be made to concurrently respond requests from the buses 154 and 122, and the wait signal to the bus 154 becomes unnecessary.

A control circuit 702 receives a request from the bus 154 and outputs a control signal 722' of an output driver 704 and write signals 741 to 74n to registers 1(711) to n (71n).

The output driver 704 outputs data of a control line 724 to the bus 154 when a control line 722 is ON; it outputs nothing when the control line 722 is OFF.

A selector 706 takes in addresses from the bus 154, selects an address corresponding to taken-in output data out of output data 731 to 73n of the registers 711 to 71n, and outputs it to a control line 724.

A selector 708 takes in addresses from the bus 122, selects an address corresponding to taken-in output data out of the output data 731 to 73n of the registers 711 to 71n, and outputs it to the bus 122.

When a write request is output to a control line 741, the register 711 takes in data from the bus 154 and outputs it to a control line 731. Operations of the registers 712 to 71n are also same as those of the register 711.

Embodiment 3

Figure 8:
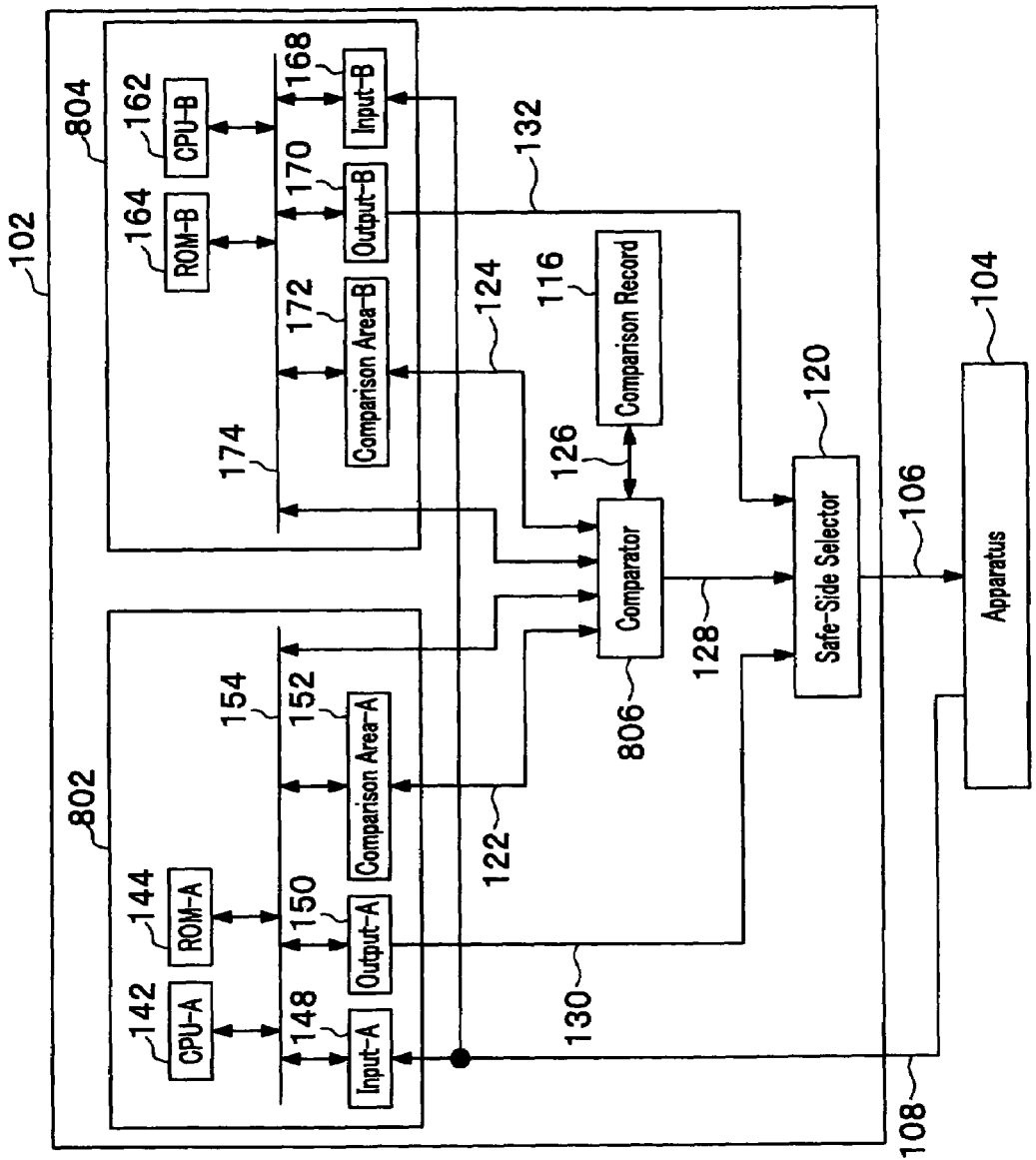
FIG. 8 is a block diagram showing a second example of the controller in accordance with the present invention.

FIG. 8 is a block diagram showing a second example of the controller in accordance with the present invention.

A difference of the embodiment from FIG. 1 exists in a point of removing the RAM-A 146 and the RAM-B 166 from the processor units 112 and 114. Alternatively making parts of the comparison area-A 152 and the comparison area-B 172 no comparison object of a comparator 806, it can be made to use the parts as a RAM.

Operations other than this are same as those of the controller of FIG. 1.

Figure 9:
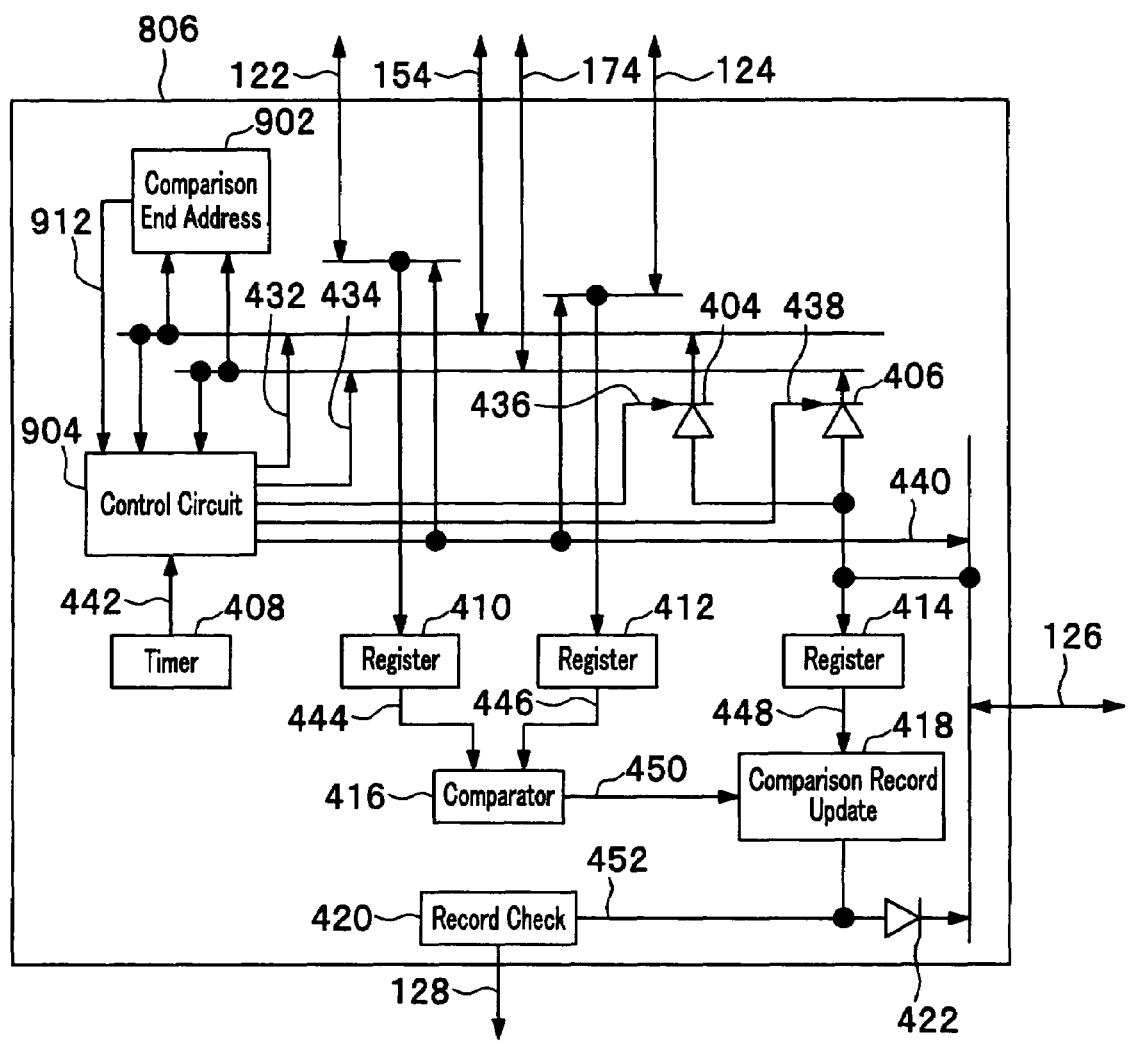
FIG. 9 is a block diagram showing a comparator 806 of FIG. 8.

FIG. 9 is a block diagram showing the comparator 806 of FIG. 8.

A difference of the embodiment from the comparator 118 of FIG. 4 exists in a point of providing a comparison-end-address storage element 902.

When receiving a write request from any of the buses 154 and 174, the comparison-end-address storage element 902 takes in values from them and outputs the taken-in values to a control line 912.

A control circuit 904 executes a processing of returning an address to a top of a comparison area in outputting the address to the control line 440 when the address is not less than a value of the control line 912.

Operations other than this are same as those of the comparator 118 of FIG. 4.

Figure 10:
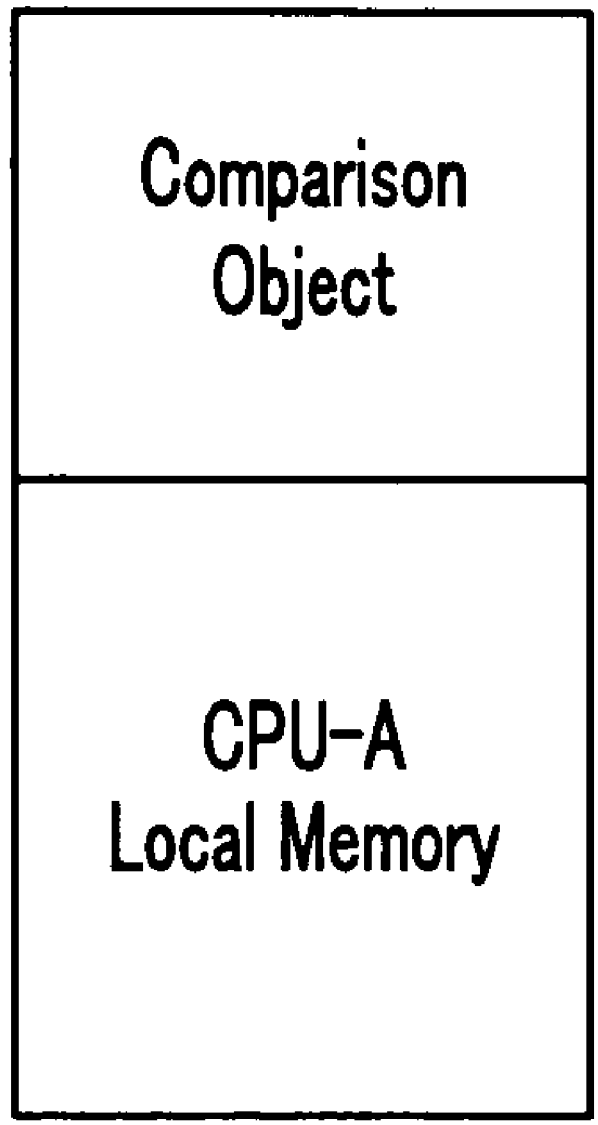
FIG. 10 is a drawing showing an address map of the comparison area-A152 of FIG. 8.

FIG. 10 is a drawing showing an address map of the comparison area-A 152 of FIG. 8.

A spacing from an address H'0000 to a comparison end address is comparison objects; a spacing from the comparison end address to H'FFFF is a local memory of the CPU-A and is no comparison object.

Embodiment 4

Figure 11:
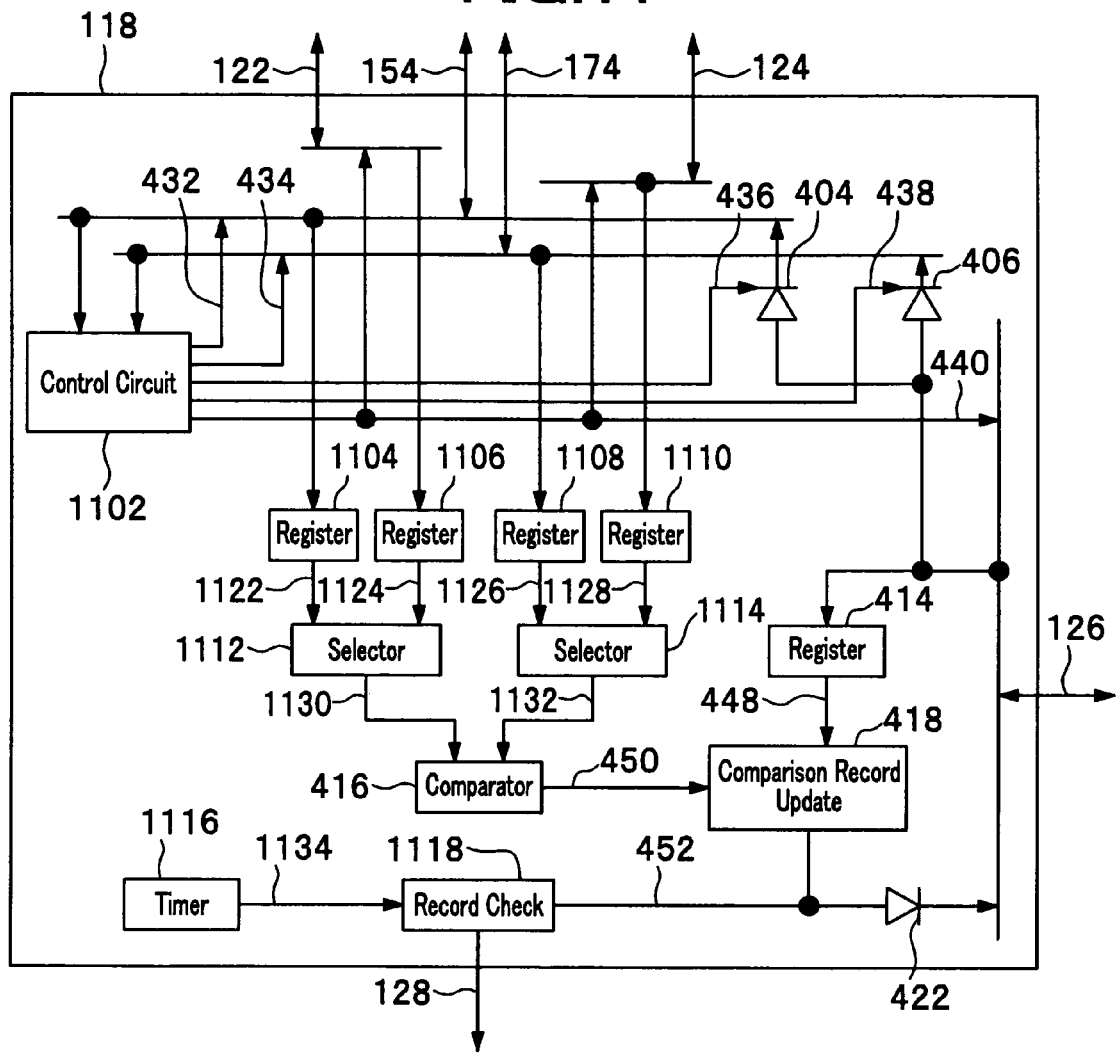
FIG. 11 is a block diagram showing a second example of the comparator 118 of FIG. 1.

FIG. 11 is a block diagram showing a second example of the comparator 118 of FIG. 1.

A difference of the embodiment from FIG. 4 exists in a point of executing a comparison operation in synchronization with not a request from a timer but a write request from any of the buses 154 and 174.

When detecting that a write is executed for a comparison area on any of the buses 154 and 174, a control circuit 1102 starts processings of a comparison and an update over a next cycle same as the control circuit 118 of FIG. 4. Then an address, which is output to the control line 440, is one where the write is executed on any of the buses 154 and 174.

A register 1104 takes in write data for a comparison area on the bus 154 and outputs it to a control line 1122.

A register 1106 takes in read data from the bus 122 and outputs it to a control line 1124.

A register 1108 takes in write data for a comparison area on the bus 174 and outputs it to a control line 1126.

A register 1110 takes in read data from the bus 124 and outputs it to a control line 1128.

A selector 1112 selects data of the control line 1122 when the write for the comparison area is executed on the bus 154; in a case other than that the selector 1112 selects data of the control line 1124 and outputs it to a control line 1130.

A selector 1114 selects data of the control line 1126 when the write for the comparison area is executed on the bus 174; in a case other than that the selector 1114 selects data of the control line 1128 and outputs it to a control line 1132.

A timer 1116 outputs a time-up signal to a control line 1134 at a constant period.

When the time-up signal output to the control line 1134 is output, a record check circuit 1118 searches whether or not a comparison record update is executed after a last time-up signal is output, other than executing the check same as in the record check circuit 420 of FIG. 4, and outputs an apparatus stoppage signal to the control line 128 if the comparison record update is not executed. Thus, when a comparison record update processing becomes not to be executed due to an unknown anomaly, it can be made to detect the anomaly and stop the apparatus.

Operations other than this are same as those of the comparator 118 of FIG. 4.

Figure 12:
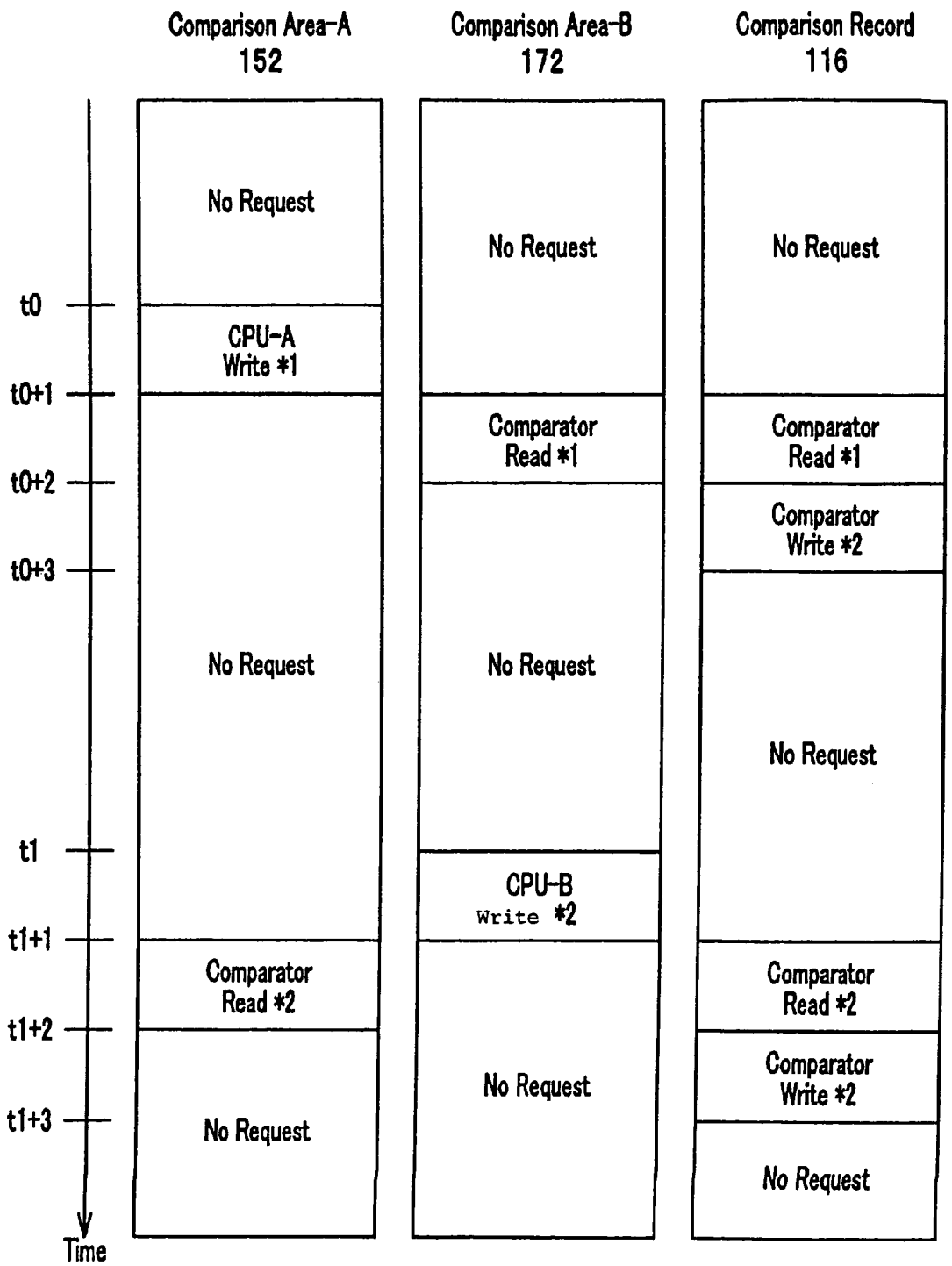
FIG. 12 is a timing chart showing an operation of the comparison area-A152, the comparison area-B172, and the comparison record storage element 116 of FIG. 1 when using the comparator 118 shown in FIG. 11.

FIG. 12 is a timing chart showing an operation of the comparison area-A 152, the comparison area-B 172, and the comparison record storage element 116 of FIG. 1 when using the comparator 118 shown in FIG. 11.

Because a write is generated during time t0 to t0+1 at the comparison area-A 152, a read of the comparison area-B 172 and the comparison record storage element 116 is executed during time t0+1 to t0+2 and a write for the comparison record storage element 116 is executed during time t0+2 to t0+3.

Because the write is generated during time t1 to t1+1 at the comparison area-B 172, the read of the comparison area-B 152 and the comparison record storage element 116 is executed during time t1+1 to t1+2 and the write for the comparison record storage element 116 is executed during time t1+2 to t1+3.

Thus, although the embodiments of the present invention are described the invention is not limited to such the embodiment and various variations are available without departing from the spirit and scope of the invention.

What is claimed is:

1. A controller for taking in an input of a status of an apparatus, executing predetermined arithmetic and logical operations, and outputting a control signal of the apparatus, the controller comprising:
   a plurality of processors for executing the arithmetic and logical operations;
   a plurality of data storage elements for storing respective results of the arithmetic and logical operations of said plurality of the processors;
   a comparator for comparing the results of the arithmetic and logical operations of said plurality of the processors stored in said plurality of the data storage elements; and
   a comparison record storage element for storing a record of the comparison results of said comparator.

2. A controller according to claim 1 further comprising a safe-side selector for controlling a control signal of an apparatus to a safe side when a record of comparison results satisfies a predetermined status, wherein the record of the comparison results is stored in said comparison record storage element.

3. A controller according to claim 1, wherein said plurality of data storage elements comprise an arbiter for arbitrating an access request for said plurality of processors and said comparator.

4. A controller according to claim 1, wherein said comparator comprises a timer for outputting a comparison start signal at a constant period and compares a result of arithmetic and logical operations of said plurality of processors while updating addresses of said plurality of data storage elements in synchronization with the comparison start signal of said timer.

5. A controller according to claim 1, wherein said comparator comprises a comparison address storage element for storing information with respect to an address of data, which is made a comparison object, out of data stored in said plurality of data storage elements.

6. A controller according to claim 1, wherein said comparator compares data corresponding to an address of said plurality of data storage elements in synchronization with a write of data to one of said plurality of the data storage elements of said plurality of processors.

7. A system, comprising:
an apparatus; and
a controller for receiving status information of said apparatus, executing predetermined arithmetic and logical operations, and outputting a control signal to said apparatus, the controller comprising:
 a plurality of processors for executing the arithmetic and logical operations;
 a plurality of data storage elements for storing respective results of the arithmetic and logical operations of said plurality of the processors;
 a comparator for comparing the results of the arithmetic and logical operations of said plurality of the processors stored in said plurality of the data storage elements; and
 a comparison record storage element for storing a record of the comparison results of said comparator.

8. The system of claim 7, wherein said controller further comprises a safe-side selector for controlling said control signal to said apparatus to a safe side when a record of comparison results satisfies a predetermined status, wherein the record of the comparison results is stored in said comparison record storage element.

9. The system of claim 7, wherein said plurality of data storage elements comprise an arbiter for arbitrating an access request for said plurality of processors and said comparator.

10. The system of claim 7, wherein said comparator comprises a timer for outputting a comparison start signal at a constant period and compares a result of arithmetic and logical operations of said plurality of processors while updating addresses of said plurality of data storage elements in synchronization with the comparison start signal of said timer.

11. The system of claim 7, wherein said comparator comprises a comparison address storage element for storing information with respect to an address of data, which is made a comparison object, out of data stored in said plurality of data storage elements.

12. The system of claim 7, wherein said comparator compares data corresponding to an address of said plurality of data storage elements in synchronization with a write of data into one of said plurality of the data storage elements of said plurality of processors.

13. A controller for controlling an apparatus, comprising:
processor means for executing arithmetic and logical operations;
data storage means for storing respective results of the arithmetic and logical operations of said processor means;
comparator means for comparing the results of the arithmetic and logical operations of said processor means stored in said data storage means; and
record storage means for storing a record of the comparison results of said comparator means.

14. The controller of claim 13, further comprising a selector means for generating a control signal to said apparatus to a safe side when a record of comparison results satisfies a predetermined status, wherein the record of the comparison results is stored in said storage means.

15. The controller of claim 13, wherein said data storage means comprises an arbiter means for arbitrating an access request for said processor means and said comparator means.

16. The controller of claim 13, wherein said comparator means comprises a timing means for outputting a comparison start signal at a constant period and comparing a result of arithmetic and logical operations of said processor means while updating addresses of said data storage means in synchronization with the comparison start signal of said timing means.

17. The controller of claim 13, wherein said comparator means comprises a comparison address storage means for storing information with respect to an address of data, which is made a comparison object, out of data stored in said data storage means.

18. The controller of claim 13, wherein said comparator means compares data corresponding to an address of said data storage means in synchronization with a write of data to said data storage means.

* * * * *